(12) United States Patent
Dambournet et al.

(10) Patent No.: US 8,642,214 B2
(45) Date of Patent: Feb. 4, 2014

(54) SILICON-CARBONACEOUS ENCAPSULATED MATERIALS

(75) Inventors: Damien Dambournet, Saint Cloud (FR); Ilias Belharouak, Bolingbrook, IL (US); Khalil Amine, Oak Brook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 168 days.

(21) Appl. No.: 13/217,691

(22) Filed: Aug. 25, 2011

(65) Prior Publication Data

US 2013/0052536 A1  Feb. 28, 2013

(51) Int. Cl.
  *H01M 4/04* (2006.01)
(52) U.S. Cl.
  USPC .............. 429/231.8; 429/218.1; 252/182.1
(58) Field of Classification Search
  USPC .................... 429/231.8, 218.1; 252/182.1
  See application file for complete search history.

(56) References Cited

U.S. PATENT DOCUMENTS

| | | | | |
|---|---|---|---|---|
| 2,697,029 A * | 12/1954 | Baker et al. | ........................ | 252/1 |
| 4,489,143 A | 12/1984 | Gilbert et al. | | |
| 6,407,339 B1 * | 6/2002 | Rice et al. | ................ | 174/110 SR |
| 7,329,377 B2 * | 2/2008 | Ha et al. | .......................... | 264/317 |
| 7,618,678 B2 | 11/2009 | Mao et al. | | |
| 7,785,661 B2 | 8/2010 | Carel et al. | | |
| 7,799,375 B2 | 9/2010 | Rashed et al. | | |
| 2006/0003098 A1 * | 1/2006 | Rashed et al. | ................. | 427/228 |
| 2009/0029256 A1 | 1/2009 | Mah et al. | | |
| 2010/0065991 A1 * | 3/2010 | Greulich-Weber et al. | ... | 264/604 |
| 2010/0236897 A1 | 9/2010 | Chiang | | |
| 2010/0330582 A1 | 12/2010 | Nakamura | | |
| 2012/0121981 A1 | 5/2012 | Harimoto | | |

FOREIGN PATENT DOCUMENTS

WO  WO-2011/013851  2/2011

OTHER PUBLICATIONS

International Search Report and Written Opinion for PCT/US2012/043115, mailed Dec. 26, 2012.
Stober et al., "Controlled Growth of Monodisperse Silica Spheres in the Micron Size Range", Journal of Colloid and Interface Science, 26, 1968, pp. 62-69.

* cited by examiner

*Primary Examiner* — Nicholas P D'Aniello
(74) *Attorney, Agent, or Firm* — Foley & Lardner LLP

(57) ABSTRACT

A process includes preparing a solution including a silicon precursor or mixture of silicon precursors and a monomer or mixture of monomers; polymerizing the monomer to form a polymer-silicon precursor matrix; and pyrolyzing the polymer-silicon precursor matrix to form an electrochemically active carbon-coated silicon material.

10 Claims, 16 Drawing Sheets

SILICON-CARBONACEOUS ENCAPSULATED MATERIALS

GOVERNMENT RIGHTS

The United States Government has rights in this invention pursuant to Contract No. DE-AC02-06CH11357 between the United States Government and UChicago Argonne, LLC, representing Argonne National Laboratory.

FIELD

Generally, the present invention relates to materials for lithium-ion battery electrodes.

BACKGROUND

Rechargeable lithium-ion batteries are now one of the primary power sources for consumer electronics. Such batteries were first produced in high volume by SONY and NEC Moli in the early 1990's. Since then, Li-ion battery technology has been very successful at penetrating high-end consumer electronic markets to replace lead-acid, Ni—Cd and Ni-MH rechargeable batteries. The worldwide annual production of Li-ion rechargeable batteries exceeds 2 billion cells, the majority of which are small size cylindrical and prismatic cells whose capacities are less than 2.8 Ah (ampere hours). Due to their high energy density and long cycle-life compared to other battery technologies, Li-ion batteries are also an attractive technology for larger size, high capacity and high power rechargeable battery markets within the transportation, telecommunication and military applications. Furthermore, economical and environmental constraints have made these batteries the main focus for hybrid electric vehicles (HEV), plug-in hybrid electric vehicles (PHEV), and electric vehicles (EV).

A typical lithium-ion battery consists of a lithium-based transition metal (Mn, Co, Ni) material as the positive electrode, a carbonaceous material (graphite or coke) as the negative electrode, and a non-aqueous electrolyte. The battery also typically has a separator between the positive and negative electrodes, and is typically enclosed in a case. Graphite/$LiCoO_2$, graphite/$LiMn_2O_4$, and graphite/$LiFePO_4$ and derivatives of these cell chemistries are the electrochemical energy storage systems of commercial production interest. The electrolyte is typically a solution including a lithium salt, e.g. $LiPF_6$, dissolved in an organic carbonate solvent. After two decades of extensive R&D, this technology appears to have reached a maturity with regard to power and energy density, despite several unsolved weaknesses.

One such weakness is related to energy density. A typical lithium-ion battery can store about 150 watt-hours of electricity per kilogram. For comparison, six kilograms of lead acid battery are required to store the same amount energy. This is a big stride indeed, but there is unlikely to be further improvements in energy density with current materials and designs. Another weakness is with respect to safety. At full charge, carbonaceous anodes are highly reactive because they operate at a potential close to that of metallic lithium, where a film forms. Such films, also known as the solid electrolyte interface (SEI), can be a source of thermal runaway when the electrode is subjected to external or internal heat.

Metallic lithium anodes are not suitable in lithium batteries because they do not form a stable passivation film with conventional electrolytes. Graphite materials are widely used as anode materials in commercial cells, however, the life expectancy of the cells is largely shortened due to irreversibility issues associated with the graphitic unstable solid electrolyte interface. It is also well known that lithium forms alloys with several metals among which silicon and tin. In this case compounds such as $Li_{4.4}Si$ and $Li_{4.4}Sn$ can provide significantly higher capacities. However, using such alloys as anodes with lithium insertion cathode materials leads to volume expansion of the electrodes, which, in turn, leads to cell failure.

SUMMARY

To address the above concerns, silicon suboxide ($SiO_x$), silicon oxycarbide ($SiO_xC$), and silicon/carbon-encapsulated materials (Si/C) as hybrid structured materials for use as advanced anode materials for lithium batteries. Such materials may address dimensional instability issues typically associated with alloy cells. The carbonaceous matrix serves as the support for the metal or metal oxides of the alloys and provide the dimensional stability during the lithium alloying process. The carbonaceous matrix can also establish the electronic conducting pathway within the electrode.

In one aspect, a process is provided including preparing a solution that includes a silicon precursor or mixture of silicon precursors, and a monomer or mixture of monomers; polymerizing the monomer or mixture of monomers to form a polymer-silicon precursor matrix; and pyrolyzing the polymer-silicon precursor matrix to form an electrochemically active carbon-coated silicon material.

In another aspect, a process is provided including contacting a silicon compound with a carbon source gas at a temperature sufficient to degrade the carbon source gas to carbon and deposit the carbon on the surface of the $SiO_2$ to form $SiO_2C$ or $SiO_xC$, wherein x is less than 2; wherein the silicon compound is silicon, a silicon suboxide, a silicon oxycarbide, or a mixture of any two or more such materials.

DETAILED DESCRIPTION

Figure 1:
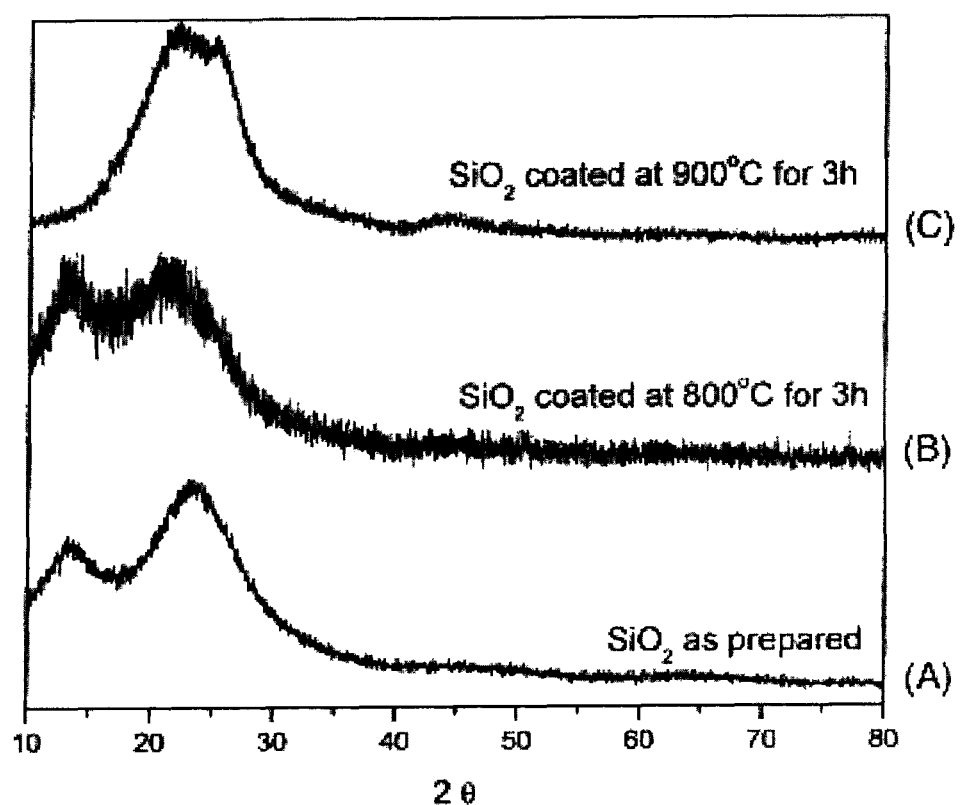
FIGS. 1A, 1B, and 1C are x-ray diffraction patterns of pristine $SiO_2$ (1A), carbon-coated $SiO_xC$ prepared at 800° C. for 3 hours (1B), and carbon-coated $SiO_xC$ prepared at 900° C. for 3 hours (1C), according to Example 1.

In one aspect, a process is provided for preparing an anode material that includes solution phase reactions. The process includes, but may not be limited to, preparing a solution of a silicon precursor and a monomer or mixture of monomers, polymerizing the monomer or mixture of monomers to form a polymeric-silicon precursor matrix, isolating the polymeric-silicon precursor matrix, and pyrolyzing the polymeric-silicon precursor matrix to form an electrochemically active, carbon-coated silicon material. Illustrative active materials include SiO$_2$C or SiO$_x$C, where x is less than 2.

In the process, the monomers and the silicon precursor are intimately mixed to form the solution. The solution may include the monomers as a neat, liquid mixture, or the solution may also include a solvent. For example, illustrative solvents include acetic acid, adipic acid, citric acid, oxalic acid, lactic acid, ascorbic acid, and folic acid. Mixtures of such solvent (acid solvents) may be used. The solution may then be heated to polymerize the monomers.

Suitable silicon precursors include those which are soluble in either the solvent, or the monomers. In some embodiments, the silicon precursors are soluble in the solvent. For example, the silicon precursor may be soluble in acetic acid. In such cases, upon contact of the silicon precursor with the monomer solution a colloidal suspension is formed. Upon heating, the monomers polymerize trapping the colloidal suspension within a polymer matrix. After polymerization, the solvent is evaporated to leave a silicon material—powder composite. During the heating and polymerization, the silicon precursor is converted to a silicon material that may include oxides of silicon, silicon alkoxides, or other silicon-containing species. The silicon material—powder composite is then pyrolyzed.

As noted, the silicon precursor is a soluble silicon containing material. Illustrative materials include, but are not limited to, silicon acetate, silicon ethoxide, silicon propoxide, or silicon isopropoxide.

Suitable monomers include those that will polymerize leading to the formation of a polymeric matrix around the silicon precursor material. The polymeric matrix that is formed includes gel particles of polymer. Upon pyrolysis, the gel particles are converted into carbon microspheres. Suitable monomers may include, but are not limited to, phenol, urea, benzene-1,3-diol, benzene-1,2-diol, benzene-1,4-diol, methylene phenyl diisocyanates, styrene, methyl methacrylate, vinyl chloride, vinyl fluoride, toluene diisocyante, melamine, formaldehyde, and other functional monomers. Mixtures of the monomers may also be used. In one embodiment, the monomers are a mixture of formaldehyde and benzene-1,2-diol. In another embodiment, the monomers are a mixture of formaldehyde and benzene-1,3-diol. In yet another embodiment, the monomers are a mixture of formaldehyde and benzene-1,4-diol. In yet another embodiment, the monomers are a mixture of formaldehyde and phenol. In yet another embodiment, the monomers are a mixture of formaldehyde and urea. In yet another embodiment, the monomers are a mixture of formaldehyde and methylene diphenyl diisocyante. In yet another embodiment, the monomers are a mixture of formaldehyde and toluene diisocyante. In yet another embodiment, the monomers are a mixture of formaldehyde and melamine.

The heating of the monomer and silicon colloidal suspension is to be performed at a temperature that is sufficient to polymerize the monomer or mixture of monomers. For example, the polymerization may be effected by heating the monomers at a temperature greater than about 25 C. In some embodiments, the temperature is greater than about 60 C. In other embodiments, the temperature is greater than about 70 C. In some other embodiments, the temperature is from about 25 C to about 150 C. In some other embodiments, the temperature is from about 70 C to about 150 C. The polymerization is conducted at temperature for a time period sufficient to prepare the polymers. In some embodiments, the time period is greater than 10 minutes. In other embodiments, the time period is greater than 1 hour. In other embodiments, the time period is greater than 2 hours. In some other embodiments, the time period is from about 10 minutes to about 5 hours. In yet other embodiments, the time period is about 2 hours.

The polymerization may also be a free-radical polymerization. For example, an initiator such as a peroxide, an azo compound, a persulfate, or other initiator as known in the art may be used. The polymerizations may also be initiated photolytically, by exposing the monomer mixture to UV light.

The pyrolysis is then performed to convert the carbon material that is the polymer to a carbon deposit (i.e. carbon microspheres as described above), which forms on the silicon as it is being converted from the silicon-containing material. The temperature of the pyrolysis is such that the silicon material—powder composite degrades to the electrochemically active, carbon-coated silicon material. In some embodiments, the temperature is from about 400° C. to about 1600° C. In other embodiments, the temperature is from about 700° C. to about 1200° C.

According to some embodiments, the pyrolyzing is conducted under a reducing atmosphere. Such a reducing atmosphere may include a gaseous mixture including, but not limited to, hydrogen, carbon dioxide, carbon monoxide, acetylene, butane, 1-3 butadiene, 1-butene, cis-2-butene, trans-2-butene, 2-2 dimethylpropane, ethane, ethylene, isobutane, isobutylene, methane, propane, toluene, and propylene. Mixtures of any two or more such gases may also be used. In some embodiments the reducing gas is provided with an inert gas. Suitable inert gases include, but are no limited to, nitrogen, helium, and argon. Mixtures of any two or more inert gases may be used. The ratio of reducing gas to inert gas may range from about 5:1 to about 1:5. In some embodiments, the ratio of reducing gas to inert gas may be about 1:1.

The process may be conducted in a furnace with a reaction having the appropriate connections effect filling of the chamber with a carbon source gas, and, optionally, evacuation of the chamber. Thus, blast furnaces, rotary furnaces, fluidized bed furnaces, tube furnaces, or other similar equipment may be used, in some embodiments.

In another aspect, a process is provided for preparing an anode material that includes gas phase deposition. The process includes, but may not be limited to, depositing a carbon layer on a silicon-containing material via carbon deposition from a carbon source gas in the presence of the silicon-containing material. The silicon compound is silicon, a silicon suboxide, a silicon oxycarbide, or a mixture of any two or more such materials. According to various embodiments, a silicon-containing material is a exposed to a gas that includes a carbon source at a temperature sufficient to degrade the carbon source gas to carbon, which then deposits on the silicon-containing material to form SiO$_2$C or SiO$_x$C, where x is less than 2 and greater than or equal to 0. The temperature is greater than 500° C. According to various embodiments, the temperature is greater than 600° C., greater than 700° C., greater than 800° C., or greater than 900° C. In some embodiments, the temperature is from 500° C. to about 1000° C. In other embodiments, the temperature is about 700° C., about 800° C., about 900° C., or about 1000° C.

The silicon-containing material may be a silicon particle, a silicon dioxide ($SiO_2$) particle, or a silicon suboxide ($SiO_x$) particle, where $0 \leq x \leq 2$. In some embodiments, the silicon-containing material is $SiO_2$. The silicon-containing material may be crystalline in some embodiments, or amorphous in other embodiments. In some embodiments where the silicon-containing material is $SiO_2$, it is pristine, amorphous $SiO_2$. As used herein, pristine means having a purity of 99% or greater. For example, in some cases, the purity of pristine $SiO_2$ is 99.9% or greater. In other embodiments where the silicon-containing material is $SiO_2$, it is produced by the Stöber method. The Stöber method is defined as a method where an alcohol, saturated alcoholic ammonia solution, ammonium hydroxide, and water are mixed. To the mixture is added an alkyl silicate, the resulting mixture being agitated to form a turbid white suspension. The suspension is then recovered by filtration. A more detailed description of the method may be found in Stöber et al. *J. Colloid Interface Sci.* 26:62 (1968), which is incorporated herein by reference.

The carbon source gas may be any hydrocarbon that will degrade to carbon at the temperature. For example, the carbon source gas may be any $C_1$-$C_{12}$ alkane, $C_1$-$C_{12}$ alkene, or $C_1$-$C_{12}$ alkyne. In some embodiments, the carbon source gas is methane, ethane, n-propane, n-butane, 2-methylpropane, n-pentane, 2-methylbutane, 2,2-dimethylpropane, hexane, ethylene, propylene, 1-butene, cis-2-butene, trans-2-butene, 2-methylpropene, 1,3-butadiene, 1-pentene, 2-pentene, 3-pentene, 2-methyl-1-butene, 2-methyl-2-butene, 3-methyl-1-butene, hexene, acetylene, acetylene, 1-butyne, 2-butyne, 1-pentyne, 2-pentyne, 3-methyl-1-pentyne, hexyne, or toluene. In some embodiments, the carbon source gas is ethylene or propylene.

In one aspect, an anode material is provided including a carbonaceous matrix that at least partially surrounds a material including silicon, a silicon suboxide, a silicon oxycarbide, or a mixture of any two or more such materials. Such materials are those as described above which are prepared by either the gas phase methods or solution phase methods. Such materials are electrochemically active in lithium cells. In one embodiment, the carbonaceous matrix encapsulates the silicon, silicon suboxide, silicon oxycarbide, or a mixture of any two or more such materials.

The anode materials may be fabricated into an anode by combining the anode materials described above with a binder, and contacting the mixture with a current collector. The current collector serves the electrical connection from the anode material to a circuit. The mixture of the anode material and the binder is typically prepared by milling the anode material with the binder in a solvent to form a paste. The paste may then be applied to the current collector and dried to form the anode. Suitable binders include, but are not limited to, polymeric materials such as polyvinylidenedifluoride (PVDF), carboxymethyl cellulose, polyimide, styrene-butadiene rubber, poly(acrylamide-co-diallyldimethylammonium chloride), and polyacrylic acid. Combinations of any two or more such polymeric materials may be used. The solvent this used to form the paste may be any that is compatible with the anode material and the binder, and will not adversely affect an electrochemical cell if residual solvent remains. Illustrative solvents include, but are not limited to, N-methylpyrrolidone (NMP), ethanol, acetone, and methanol. Combinations of any two or more such solvents may be used.

In another aspect, an electrochemical device is provided including an anode as described above and which includes a carbonaceous matrix that at least partially surrounds a material including silicon, a silicon suboxide, a silicon oxycarbide, or a mixture of any two or more such materials. The electrochemical device may also include a cathode and a non-aqueous electrolyte.

Suitable cathode materials include, but are not limited to, $LiCoO_2$, $LiFePO_4$, $LiNi_{1/3}Co_{1/3}Mn_{1/3}O_2$, $LiMn_2O_4$, and $LiNi_{0.5}Mn_{1.5}O_4$. The cathode may include a mixture of any two or more such materials.

Suitable non-aqueous electrolytes include a solvent and a salt. Suitable solvents for the non-aqueous electrolyte include, but are not limited to, carbonate-based solvents, oligo(ethyleneglycol)-based solvents, fluorinated oligomers, dimethoxyethane, triglyme, dimethylvinylene carbonate, tetraethyleneglycol, dimethyl ether, polyethylene glycols, sulfones, sulfolane, and γ-butyrolactone. Of course, the solvent may be a mixtures of such solvents. The solvents support lithium-ion and oxygen transport through electrochemical cells prepared with the solvents.

In some embodiments, the salt is a lithium salt. Illustrative lithium salts are not particularly limited, as long as it dissolves in the solvent of the electrolyte. Illustrative lithium salts that may be used in the electrolytes include, but are not limited to, $LiClO_4$, $LiBF_4$, $LiAsF_6$, $LiSbF_6$, $LiPF_6$, $LiCF_3SO_3$, $Li(CF_3SO_2)_2N$, $Li(CF_3SO_2)_3C$, $LiC_6F_5SO_3$, $LiAlCl_4$, $LiGaCl_4$, $LiSCN$, $LiO_2$, $LiCO_2CF_3$, $LiN(SO_2C_2F_5)_2$, lithium alkyl fluorophosphates, lithium bis(oxalato) borates $Li[B(C_2O_4)_2]$ and $Li[BF_2C_2O_4]$, $Li_2B_{12}X_{12-n}H_n$, wherein X is OH, F, Cl, or Br, and n ranges from 0 to 12, or $Li_2B_{10}X_{10-n}H_n$, wherein X is OH, F, Cl, or Br, and n ranges from 0 to 10.

The present technology, thus generally described, will be understood more readily by reference to the following examples, which are provided by way of illustration and are not intended to be limiting.

EXAMPLES

General

Pristine, amorphous $SiO_2$ was prepared using tetraethylsiloxane (TEOS), ethanol, and distilled water according to the Stöber method. The $SiO_2$ obtained by the method is amorphous.

Example 1

General Gaseous Coating Method. The carbon-coating process was carried out in a preheated furnace reactor (at 700° C., 800° C., 900° C., or 1000° C.). In the reactor, a propylene-nitrogen mixture as the carbon source was fed to $SiO_2$ prepared by the Stöber method (above). The carbon coating experiments were carried out at furnace temperature for 3 hours. No crystallization of the amorphous $SiO_2$ was observed by the completion of these experiments. The $SiO_xC$ materials obtained are black in color, thereby indicating carbon uptake.

Typical coating method. $SiO_2$ (3 g) is introduced in a rotary furnace and then heated up to 700° C., 800° C., 900° C., or 1000° C. The furnace is flashed with a gas that includes propylene and nitrogen in a ratios of 1:9, and the furnace is held at temperature for 3 hours. The furnace is then cooled to room temperature, and the carbon coated $SiO_2$ collected.

Characterization

FIG. 1 includes the x-ray diffraction (XRD) patterns of pristine $SiO_2$, and carbon-coated $SiO_2$ ($SiO_xC$) at 800° C. and 900° C. for 3 hours. The XRD patterns show that the material remains amorphous and no other phase, such as SiC, has formed during the heat treatment.

Figure 2A:
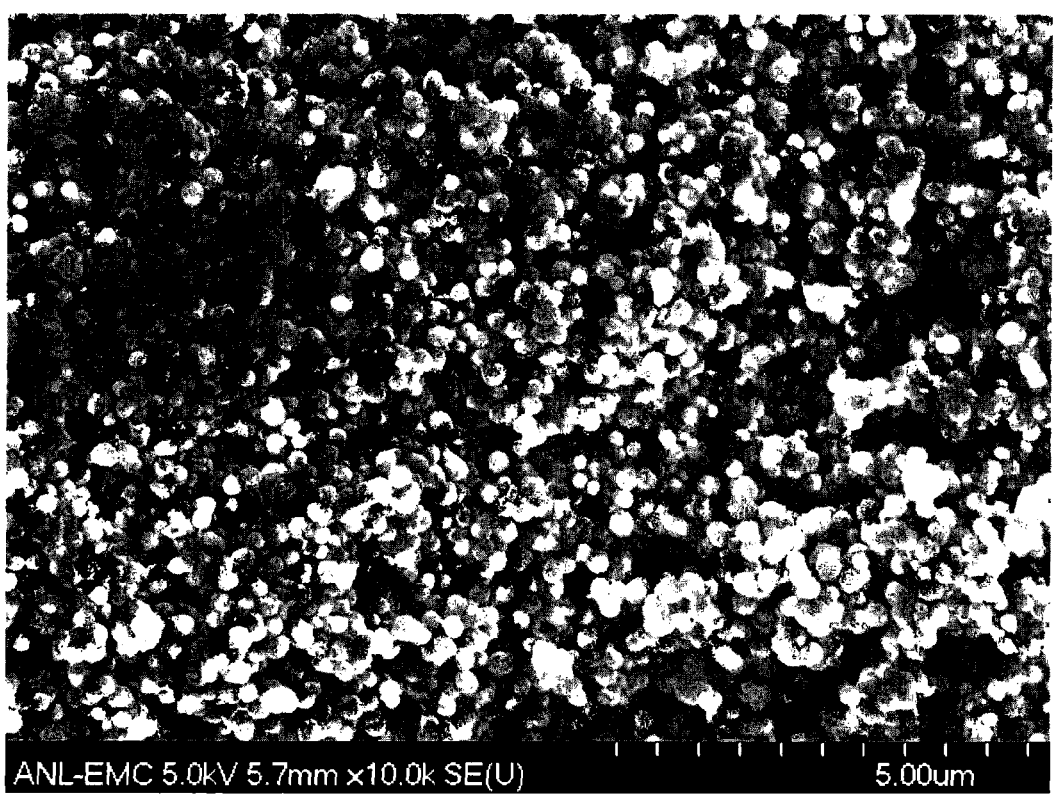
FIGS. 2A and 2B are SEM images of $SiO_xC$, prepared at 900° C. for 3 hours, according to Example 1, at lower (2A) and higher (2B) magnification.
Figure 2B:
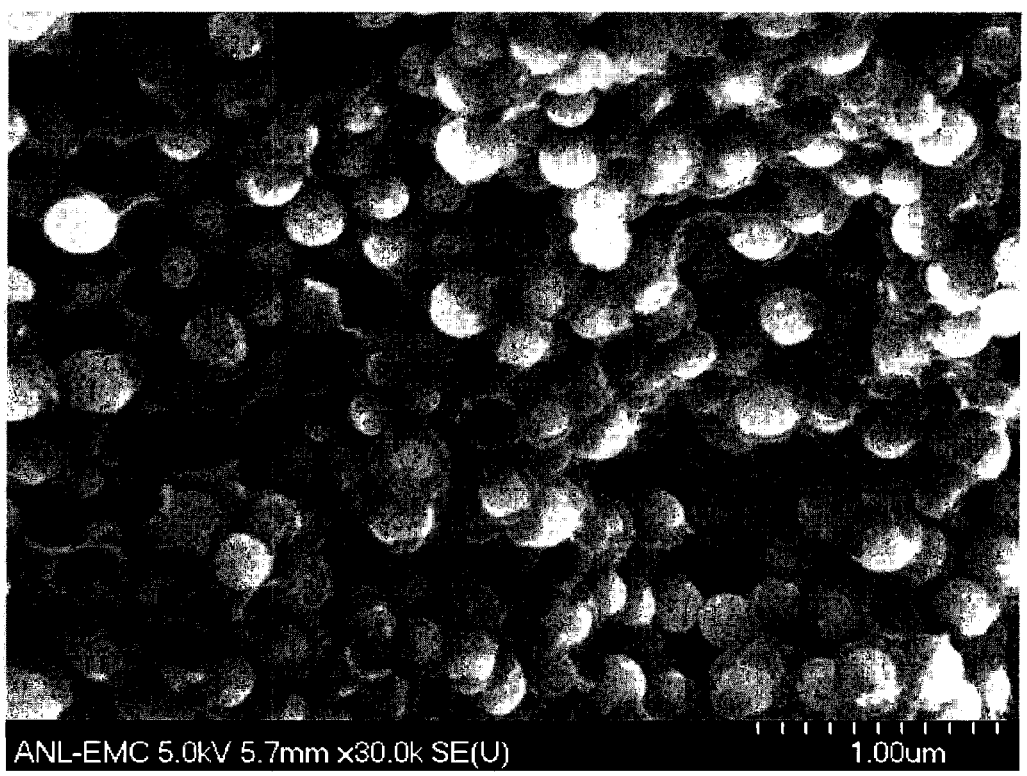
Figure 3:
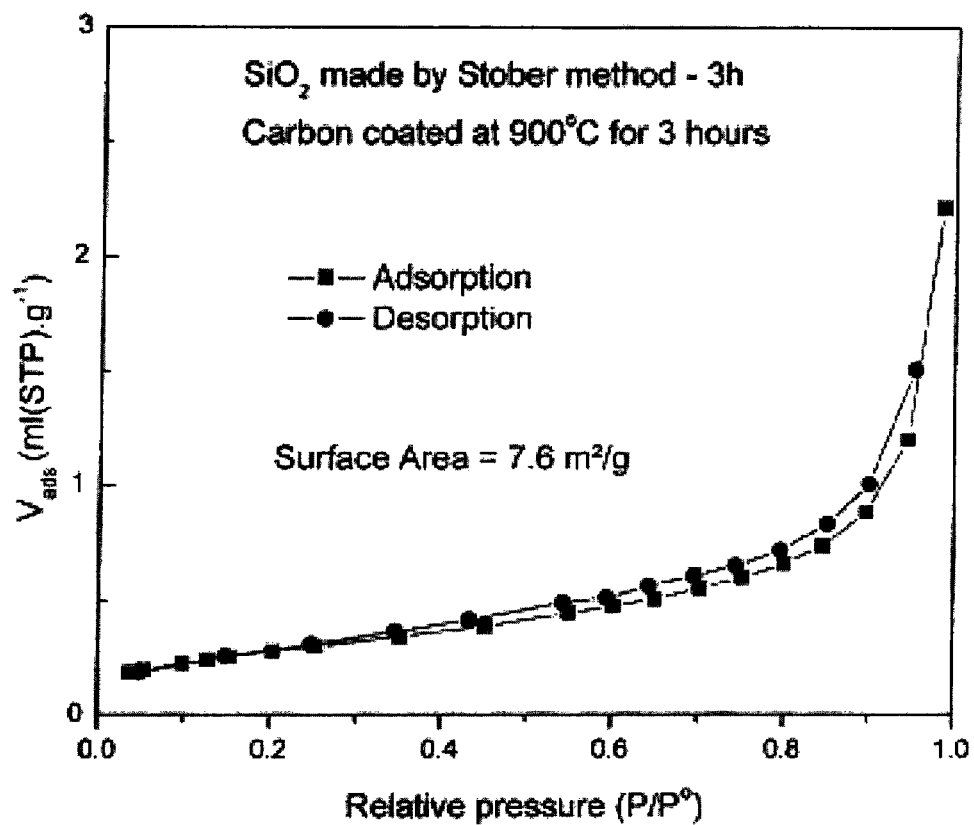
FIG. 3 is a nitrogen isotherm of $SiO_xC$ prepared at 900° C. for 3 hours, according to Example 1.
Figure 4:
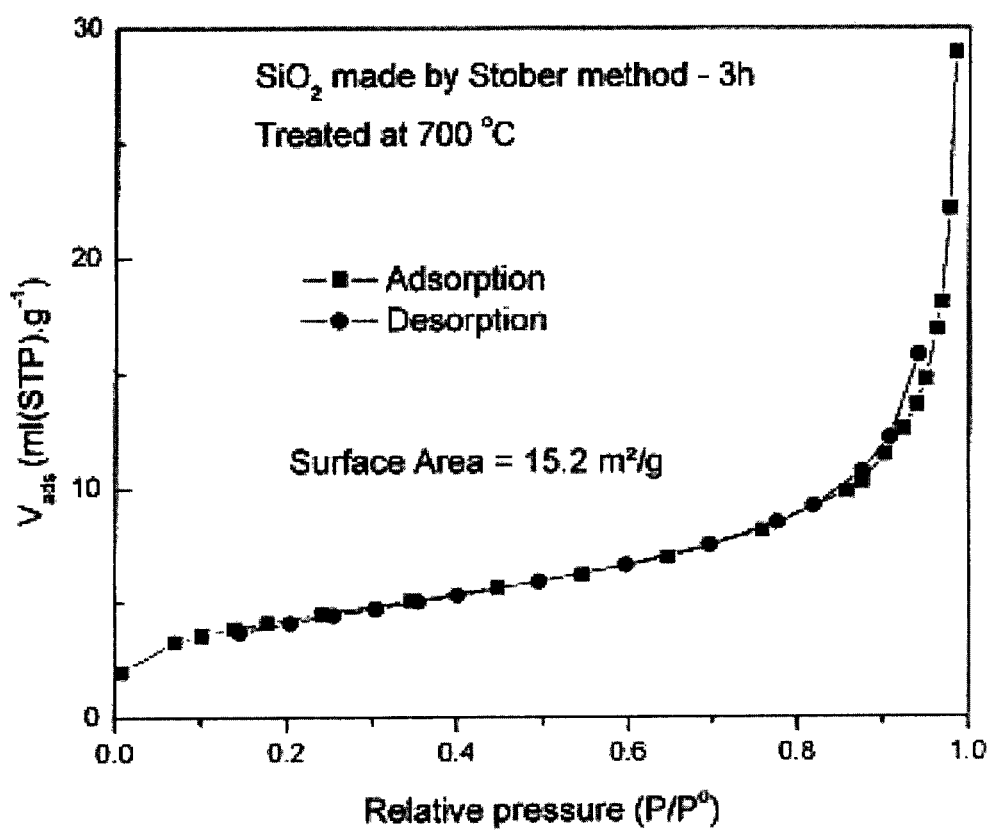
FIG. 4 is a nitrogen isotherm of $SiO_xC$ prepared at 700° C. for 3 hours, according to the examples.

FIGS. 2A and B show the scanning electron microscopy images of $SiO_x$—C coated at 900° C. Clear evidence of the carbon shell can be noticed surrounding the spherical $SiO_x$ particles. FIG. 3 shows the nitrogen isotherm of $SiO_x$—C coated at 900° C. for 3 hours. FIG. 4 shows the nitrogen isotherm of $SiO_x$—C coated at 700° C. for 3 hours. The surface area values were 7.6 and 15.2 $m^2/g$ for the materials coated at 900° C. and 700° C., respectively. The decrease in surface area while increasing the temperature indicates that a larger content of carbon has been deposited on the surface of $SiO_x$ particles.

Figure 5:
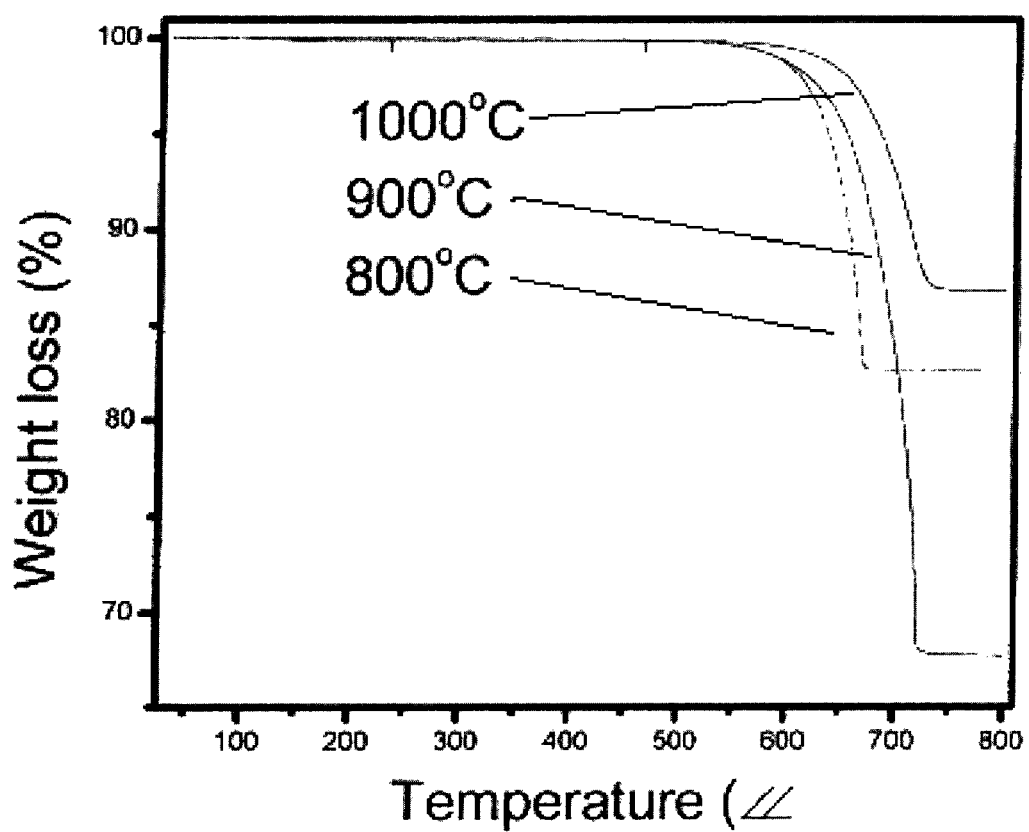
FIG. 5 is a thermal gravimetric analysis (TGA) graph of $SiO_xC$ materials coated at 800° C., 900° C., and 1000° C., according to the examples.

FIG. 5 shows the thermal gravimetric analysis of $SiO_xC$ materials coated at 800° C., 900° C., and 1000° C. The materials were coated for 3 hours. The carbon uptake for the material that was coated at 900° C. was 33% per weight. In other words, the particles contains 33 wt % carbon. The curves shows the amount of carbon uptake and the temperature above which the carbon was removed. For each of the samples, the temperature at which the carbon was removed was about 600° C.

Figure 6:
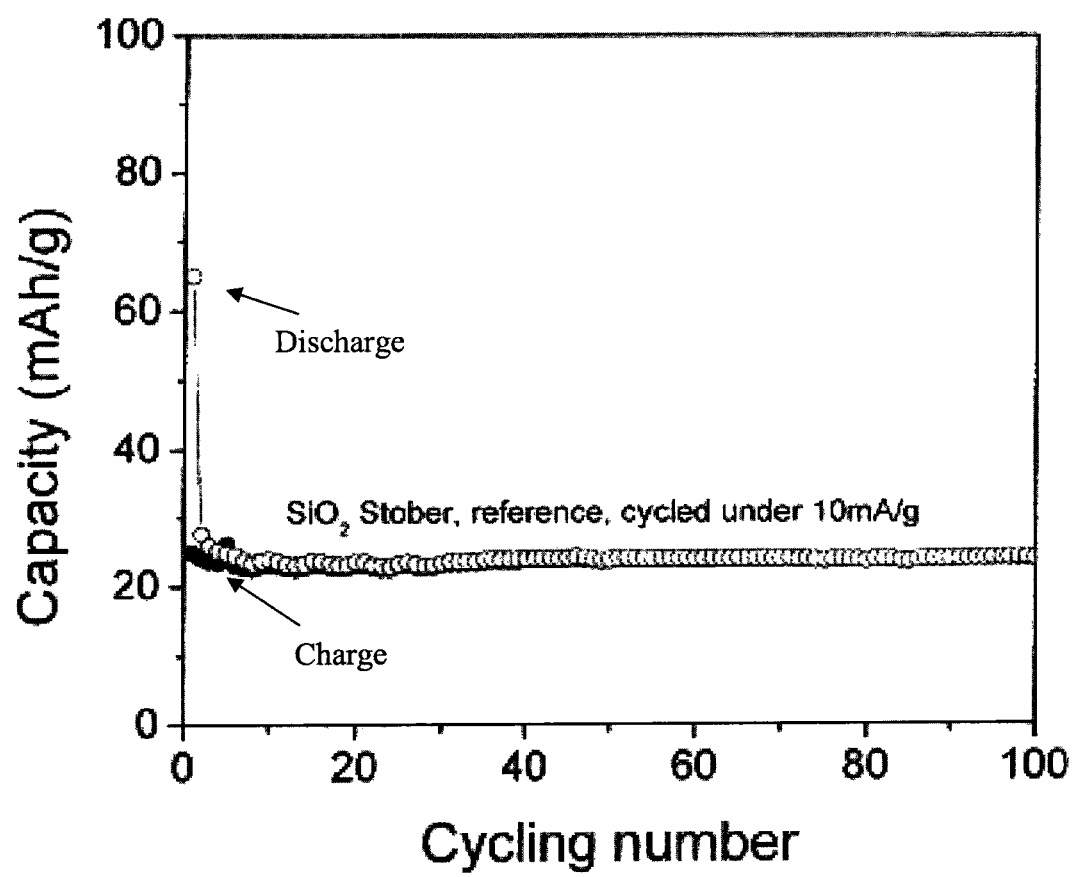
FIG. 6 is a cyclic voltammograms for amorphous $SiO_2$ in a lithium cell, according to Example 1.

FIG. 6 shows the cycling of amorphous $SiO_2$ in a lithium cell. Electrodes were prepared using of 80 wt % active material, 10 wt % acetylene black as the conductive agent, and 10 wt % polyvinylidene difluoride as the binder. Electrodes having a surface area of 1.6 $cm^2$ were assembled into CR2032-type coin cells within a helium atmosphere in a glove box. Lithium was used as the negative electrode. Copper was used as the current collector. A solution of $LiPF_6$ (1.2M in ethylene carbonate:ethyl methyl carbonate 3:7 by volume) was used as the electrolyte. The $Li/SiO_2$ cells exhibited a 20 mAh/g specific capacity. For reference, a typical graphite anode delivers a specific capacity of about 300 mAh/g. Accordingly, by comparison, $SiO_2$ is an almost inactive anode material. However, the $SiO_xC$ greatly improves the anode capacity.

Figure 7:
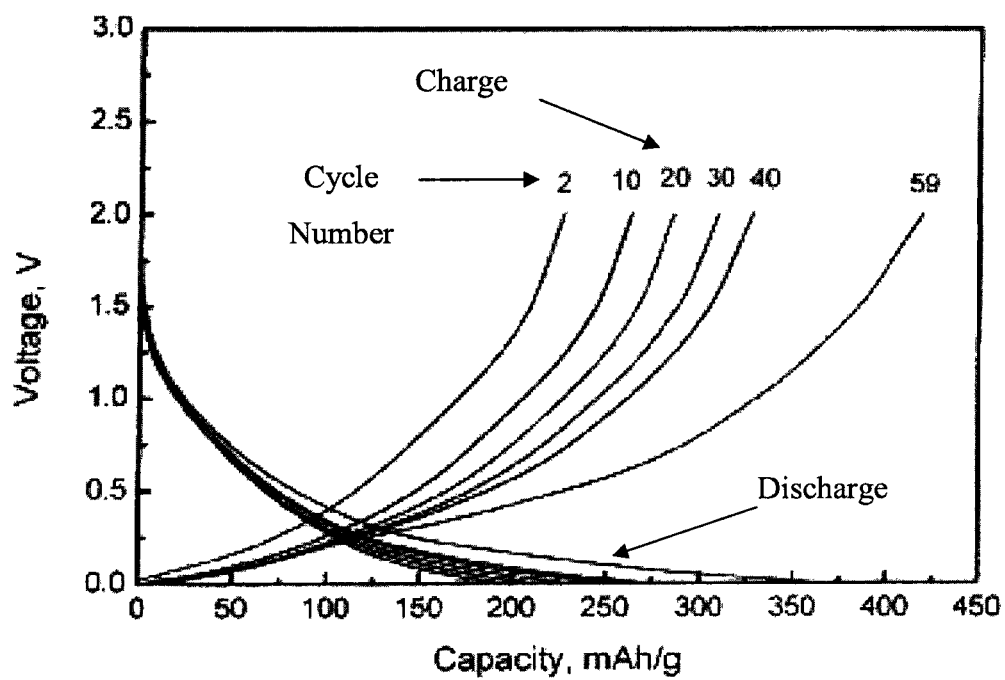
FIG. 7 is a voltage profile for a Li/$SiO_xC$ cell, according to Example 1.

FIG. 7 shows the voltage profile of a $Li/SiO_xC$ cell, which exhibits an improvement of the capacity upon cycling with an average voltage of about 0.25V.

Figure 8:
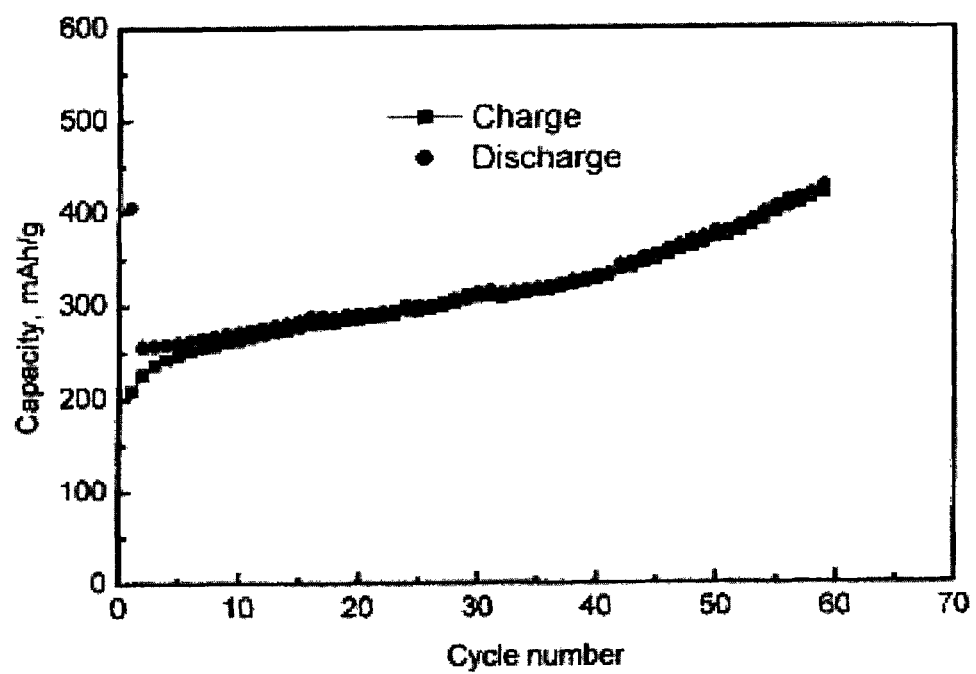
FIG. 8 is a graph of specific capacity versus cycling of a Li/$SiO_xC$ cell, according to Example 1.

FIG. 8 is a graph of the specific capacity versus cycling of a $Li/SiO_xC$ cell. The capacity of the cell improved with cycling starting from around 300 mAh/g to above 400 mAh/g.

Example 2

Solution Coating Method. To prepare a silicon-carbon encapsulated material, silicon acetate was dissolved in acetic acid with stirring. After the formation of a colloidal suspension, a formaldehyde solution of benzene-1,3-diol was added. Heating of the solution led to the polymerization of benzene-1,3-diol and formaldehyde. The acetic acid was then evaporated. The dry powder (about 5 g) was pyrolyzed under a reducing atmosphere of $H_2/He$ (3:97) at 700° C. for 4 h.

Characterization

Figure 9:
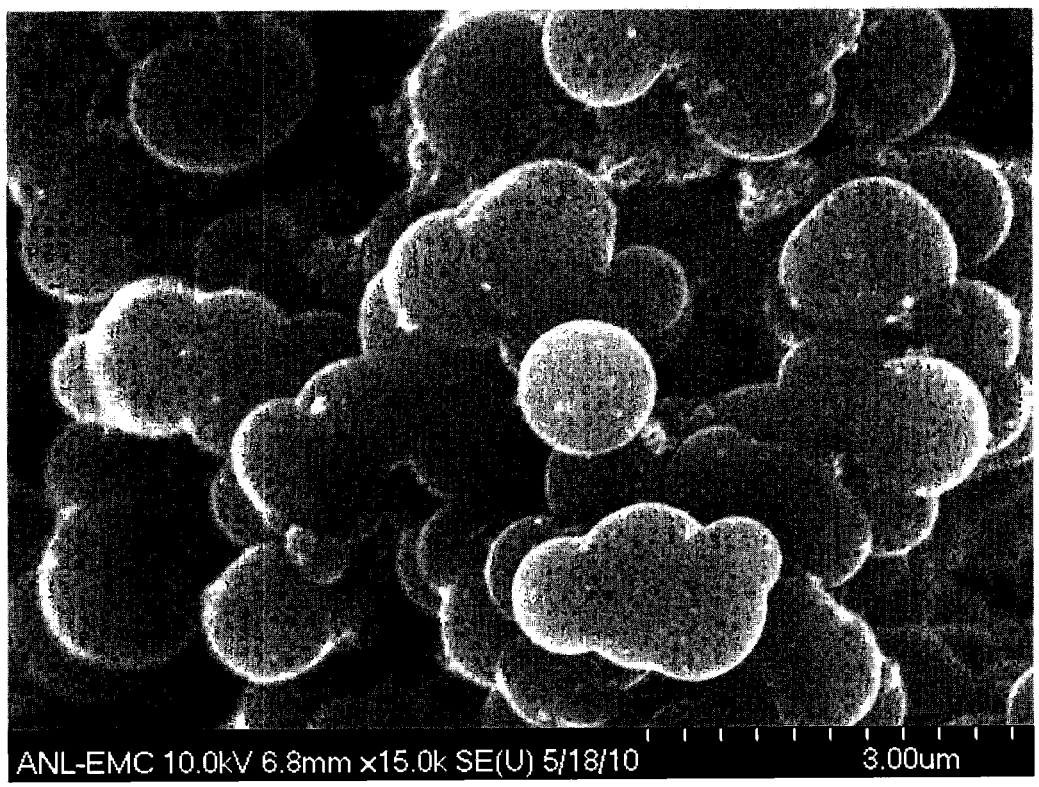
FIG. 9 is an SEM image of Si/C material according to Example 2.
Figure 10:
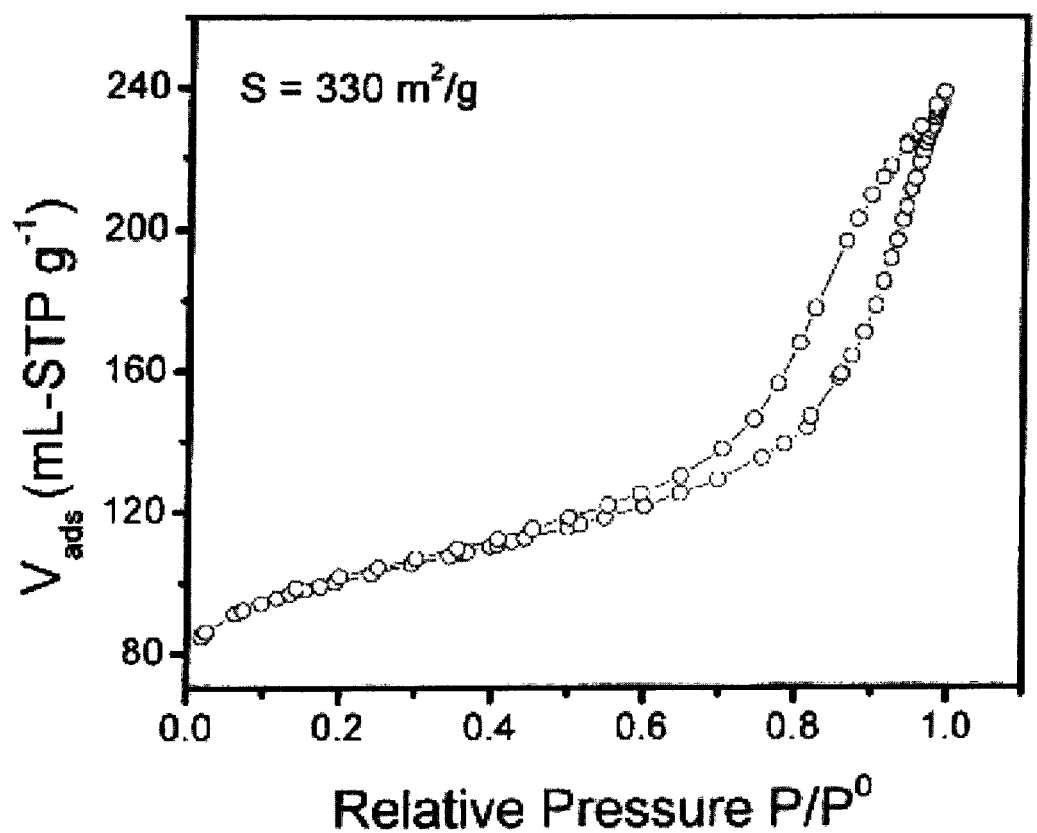
FIG. 10 is a nitrogen isotherm graph of Si—C prepared at 700° C., according to Example 2.
Figure 11:
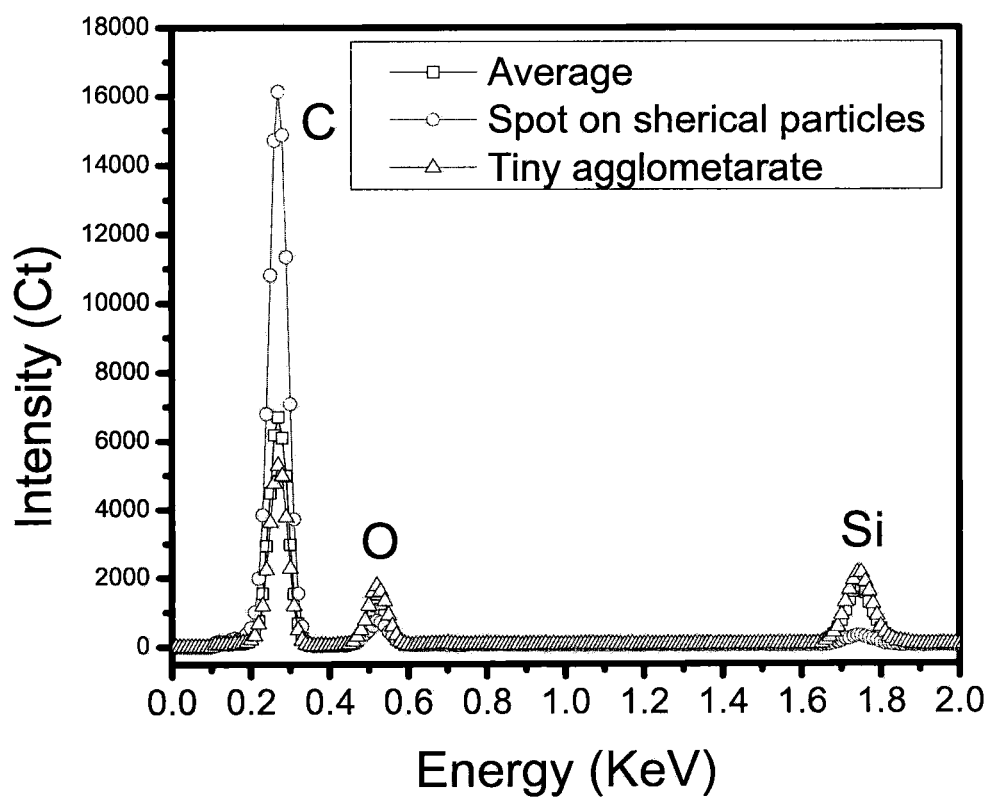
FIG. 11 is an energy dispersive x-ray of Si—C prepared at 700° C., according to Example 2.

FIG. 9 shows the scanning electron microscopy image of the Si/C encapsulated material illustrating spherical carbon embedding silicon and silicon oxide. FIG. 10 shows the nitrogen isotherm of Si—C prepared at 700° C. The surface area of the material reached 330 $m^2/g$. FIG. 11 shows the energy dispersive x-ray of Si—C prepared at 700° C. The main elements that were present within the matrix of the hybrid material are carbon and silicon with existence of amounts of oxygen bonded to silicon.

Figure 12:
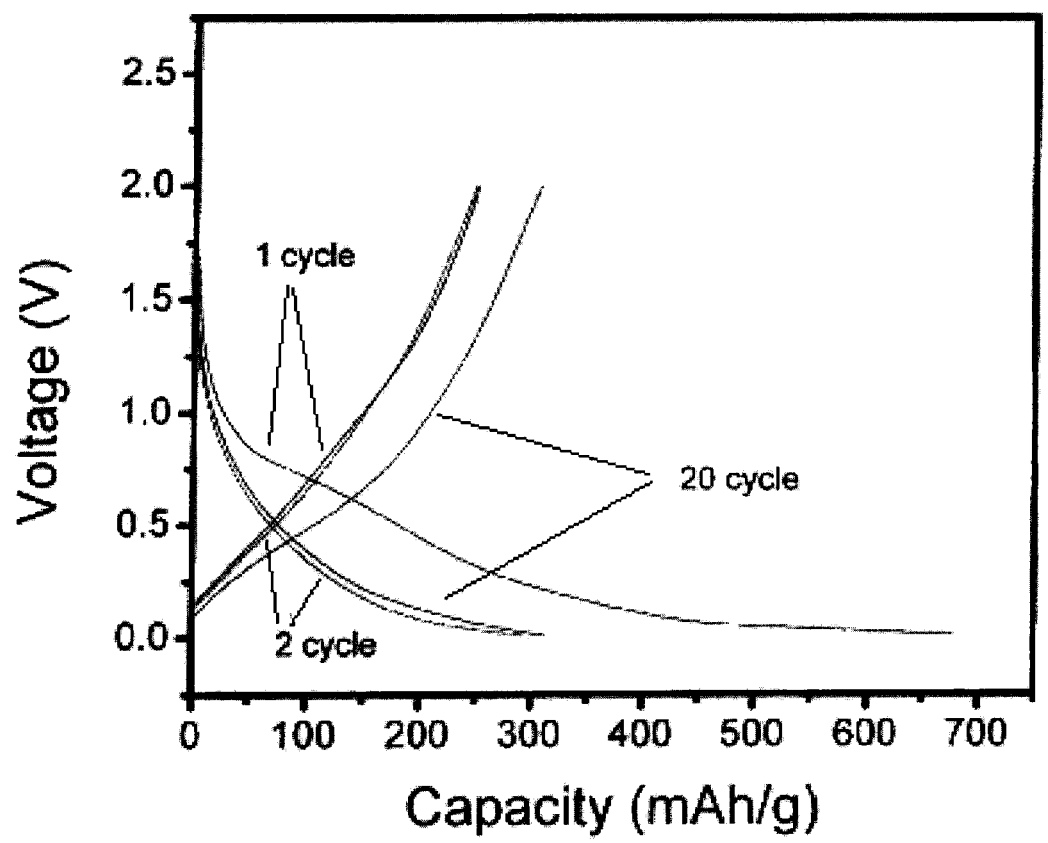
FIG. 12 is a voltage profile of a Li/$SiO_xC$ cell, according to Example 2.
Figure 13:
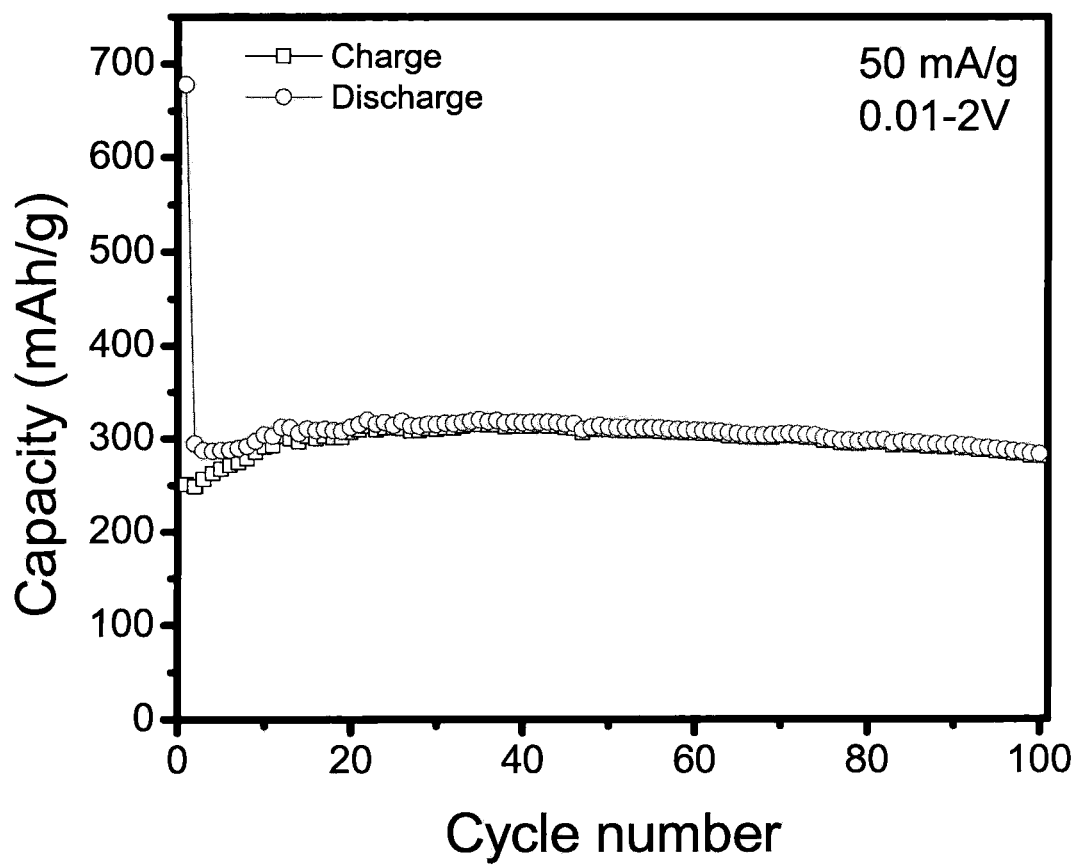
FIG. 13 is a cyclic voltammogram for a Li/SiO$_x$C cell, according to Example 2.
Figure 14:
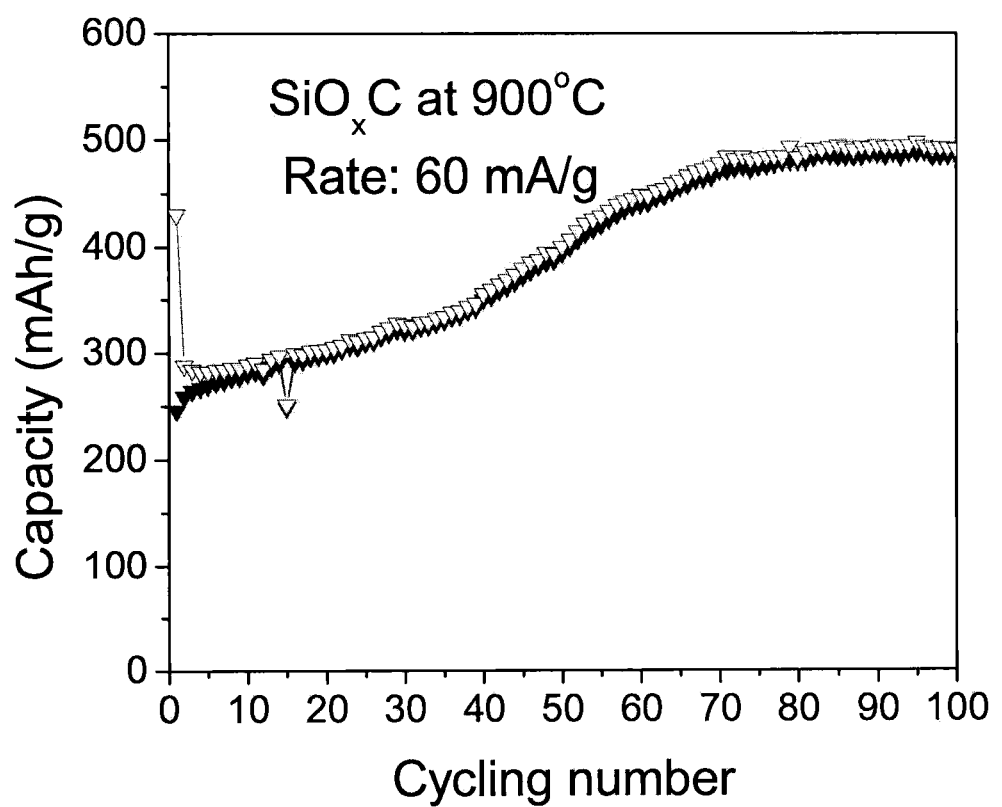
FIG. 14 is a graph of specific capacity versus cycling of a Li/SiO$_x$C cell, where the SiO$_x$C was prepared according to Example 1, at 900° C.
Figure 15:
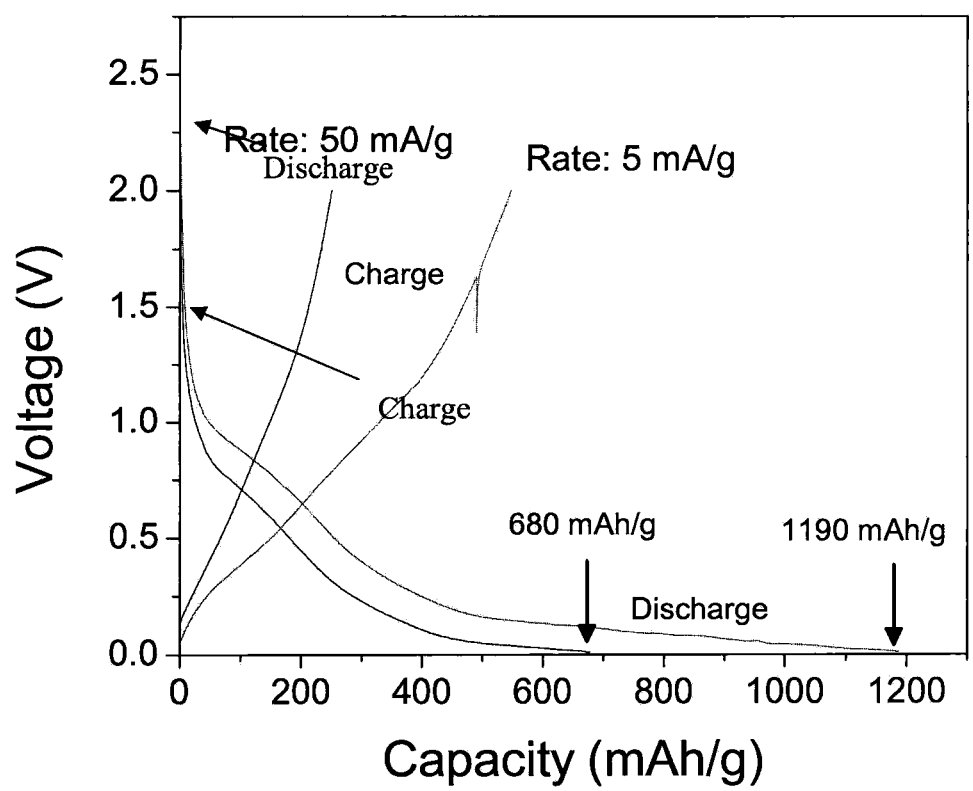
FIG. 15 is a graph of voltage versus specific capacity of a Li/SiO$_x$C cell, where the SiO$_x$C was prepared according to Example 2.

FIG. 12 shows the voltage profile of $Li/SiO_xC$ cell fabricated with the material prepared at 700° C. from Example 2. The initial discharge capacity of the cell was 700 mAh/g. The reversible capacity remained around 300 mAh/g. FIG. 13 shows the cycling of $Li/SiO_xC$ cell. The cell capacity remained constant for 100 cycles.

The two methods (gaseous coating and solution coating) provide a way to prepare SiOxC composites which show excellent electrochemical performance when used as anodes for lithium ion batteries. The gas-phase reaction enables the preparation of SiOxC particles with a carbonaceous network that activates the electrochemical properties versus lithium. The pristine material has been shown to be electrochemically inactive. The solution phase process provides an efficient method allowing for the direct integration of the carbonaceous network through polymerization with the $SiO_x$ thereby forming a composite that is active as an anode for lithium ion batteries. The above described methods enable the energy and power of SiOx-C anodes without jeopardizing the safety characteristics.

For the purposes of this disclosure and unless otherwise specified, "a" or "an" means "one or more."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. A process of forming an electrochemically active material, the process comprising:
    preparing a solution comprising:
        a silicon precursor or mixture of silicon precursors; and
        a monomer or mixture of monomers;
    polymerizing the monomer to form a polymer-silicon precursor matrix; and
    pyrolyzing the polymer-silicon precursor matrix to form an electrochemically active carbon-coated silicon material which is a compound of formula $SiO_2C$ or $SiO_xC$, wherein x is less than 2 and greater than 0;
    wherein: the monomer or mixture of monomers comprises phenol, urea, benzene-1,3-diol, benzene-1,2-diol, benzene-1,4-diol, methylene phenyl diisocyanates, styrene, methyl methacrylate, vinyl chloride, vinyl fluoride, toluene diisocyanate, melamine, or formaldehyde.

2. The process of claim 1, wherein silicon precursor comprises a soluble silicon containing material.

3. The process of claim 1, wherein the silicon precursor comprises silicon acetate, silicon ethoxide, silicon propoxide, or silicon isopropoxide.

4. The process of claim 1, wherein the polymerizing comprises heating the solution to a temperature sufficient to polymerize the monomer or mixture of monomers.

5. The process of claim 4, wherein the temperature is from about 25° C. to about 150° C.

6. The process of claim 1, wherein the pyrolyzing comprising heating the polymer-silicon precursor matrix to a temperature sufficient to degrade the polymer and silicon precursor to the electrochemically active, carbon-coated silicon material.

7. The process of claim 6, wherein the temperature is from about 400° C. to about 1600° C.

8. The process of claim 1, wherein the pyrolyzing is conducted under a reducing atmosphere.

9. The process of claim 8, wherein the reducing atmosphere comprises a reducing gas comprising hydrogen, carbon dioxide, carbon monoxide, acetylene, butane, 1,3-butadiene, 1-butene, cis-2-butene, trans-2-butene, 2-2 dimethylpropane, ethane, ethylene, isobutane, isobutylene, methane, propane, toluene, or propylene.

10. The process of claim 1, wherein the silicon precursor comprises silicon acetate, silicon ethoxide, silicon propoxide, or silicon isopropoxides; and the monomer or mixture of monomers comprises phenol, urea, benzene-1,3-diol, benzene-1,2-diol, benzene-1,4-diol, methylene phenyl diisocyanates, styrene, methyl methacrylate, vinyl chloride, vinyl fluoride, toluene diisocyanate, melamine, or formaldehyde.

* * * * *